United States Patent [19]

Kubo et al.

[11] Patent Number: 4,551,729

[45] Date of Patent: Nov. 5, 1985

[54] METHOD OF MAKING THERMAL TRANSFER TYPE MULTICOLOR PRINTING

[75] Inventors: Takeshi Kubo, Tokyo; Junji Kawano, Ise; Fumio Takahashi, Ise; Tsutomu Yamaguchi, Ise, all of Japan

[73] Assignee: Shinko Electric Co., Ltd., Tokyo, Japan

[21] Appl. No.: 511,630

[22] Filed: Jul. 7, 1983

[30] Foreign Application Priority Data

Jul. 9, 1982 [JP] Japan ............................... 57-119241

[51] Int. Cl.$^4$ ............................................. G01D 15/10

[52] U.S. Cl. ................................ 346/1.1; 346/76 PH; 400/224.2; 400/240.3

[58] Field of Search .................. 400/201, 224.2, 240.3, 400/120, 240.2; 346/76 PH, 76 R, 1.1, 105, 106; 219/216 PH; 226/32, 33, 34, 35

[56] References Cited

U.S. PATENT DOCUMENTS 4,334,231 6/1982 Regehr ................................. 346/35

4,388,628 6/1983 Moriguchi et al. ................. 400/120

FOREIGN PATENT DOCUMENTS 0154193 12/1980 Japan ............................... 400/240.3

*Primary Examiner*—Thomas H. Tarcza

*Assistant Examiner*—A. Evans

*Attorney, Agent, or Firm*—Cushman, Darby & Cushman

[57] ABSTRACT

A method for making a thermal transfer type multicolor printing. An ink ribbon is set over a platen roller with a printing paper being interposed between them, the ink ribbon having at predetermined intervals a plurality of ink zones each carrying one of heat-dissolving inks of different colors. Then, one of the ink zones is positioned at a printing position on the platen roller, the one ink zone being of a predetermined color. A thermal head is placed at the printing position against the positioned one ink zone, and drived for transferring a first dot line of the ink of the one ink zone to the printing paper so that one picture component, for the predetermined color, of a picture to be printed is reproduced by the use of the ink of the one ink zone. Thereafter, the printing paper and the ink ribbon are advanced for a subsequent printing when unreproduced portion of the picture component exists. The procedures of the driving of the thermal head and the advancing of the printing paper and the ink ribbon are repeated until the whole picture component for the predetermined color is reproduced on the printing paper. Then, the procedures after the setting of the ink ribbon are repeated with respect to the other ink zones of different colors for reproducing the remaining picture components of the different colors on the printing paper, so that a multicolor picture is reproduced on the printing paper.

4 Claims, 9 Drawing Figures

METHOD OF MAKING THERMAL TRANSFER TYPE MULTICOLOR PRINTING

BACKGROUND OF THE INVENTION

The present invention relates to a method of making a thermal transfer type multicolor printing by the use of transfer ribbons which carries a plurality of heat-dissolving inks.

With the wide use of color cathode ray tubes (CRT) in the display of personal computors and CAD systems, there has been a strong need for a printer which provides multicolor hardcopies of pictures on color CRT. In order to meet such need, there has been developed, for instance, the ink jet type multicolor printing method, but this method is complicated in operation processes and is liable to produce mechanical troubles in ink clogging in ink nozzles.

Among the other type of printing methods, there is the thermal transfer printing method, in which thermal patterns are applied to a heat-sensitive paper by means of a thermal head to thereby carry out a monocolor printing on that paper, or to an ink transfer ribbon to transfer a heat-dissolving ink, which is applied over that transfer ribbon, onto a printing paper whereby monocolor printing is carried out. For example, U.S. Pat. No. 4,334,231 discloses a thermal printer for printing the content of a display screen on thermally sensitive paper. The disclosure of that patent is incorporated herein by reference. Such a type of method is less complicated in operation and hence mechanical troubles are less liable to occur, but it is restricted to monocolor printings. Any multicolor printing method of the thermal transfer type has not yet been put into practical use.

SUMMARY OF THE INVENTION

Accordingly, it is an object of the present invention to provide a method of making a thermal transfer type multicolor printing which provides a multicolor hardcopy of information on the color CRT or color data of computors.

It is another object of the present invention to provide a method of making a thermal transfer type multicolor printing in which the multicolor printing is performed with a simple process at high speed as compared to the ink jet type multicolor printer, whereby troubles in printing are less liable to occur.

In the method of making a thermal transfer type multicolor printing according to the present invention, an ink ribbon is set over a platen roller with a printing paper being interposed between them, the ink ribbon having at predetermined intervals a plurality of ink zones each carrying one of heat-dissolving inks of different colors. Then, one of the ink zones is positioned at a printing position on the platen roller, the one ink zone being of a predetermined color. A thermal head is placed at the printing position against the positioned one ink zone, and drived for transferring the ink of the one ink zone to the printing paper so that a first dot line of one picture component, for the predetermined color, of a picture to be printed is reproduced by the use of the ink of the one ink zone. Thereafter, the printing paper and the ink ribbon are advanced for a subsequent printing when unreproduced portion of the picture component exists. The procedures of the driving of the thermal head and the advancing of the printing paper and the ink ribbon are repeated until the whole picture component for the predetermined color is reproduced on the printing paper. Then, the thermal head is moved away from the printing position, after which a predetermined restarting portion of the printing paper is returned to the printing position on the platen roller for reproducing the remaining picture components. Thereafter, the procedures after the setting of the ink ribbon are repeated with respect to the other ink zones of different colors for reproducing the remaining picture components of the different colors on the printing paper, so that a multicolor picture is reproduced on the printing paper.

BRIEF DESCRIPTION OF THE DRAWINGS

While the specification concludes with claims which particularly point out and distinctly define the subject matter which is regarded as the invention, it is believed that the invention will be more clearly understood from the following detailed description and the accompanying drawings, in which:

DETAILED DESCRIPTION OF PREFERRED EMBODIMENTS OF THE INVENTION

Before describing one embodiment of the present invention, the subtractive mixture method the present invention adopts will be described. According to the subtractive mixture method, a picture of a predetermined color can be obtained by appropriately combining yellow, magenta and cyan picture components of the color picture, the cyan, magenta and yellow pictures absorbing only red light, green light and blue light from white light respectively. Colors shown in FIG. 1 are obtained by superposing cyan, magenta and yellow.

Figure 2:
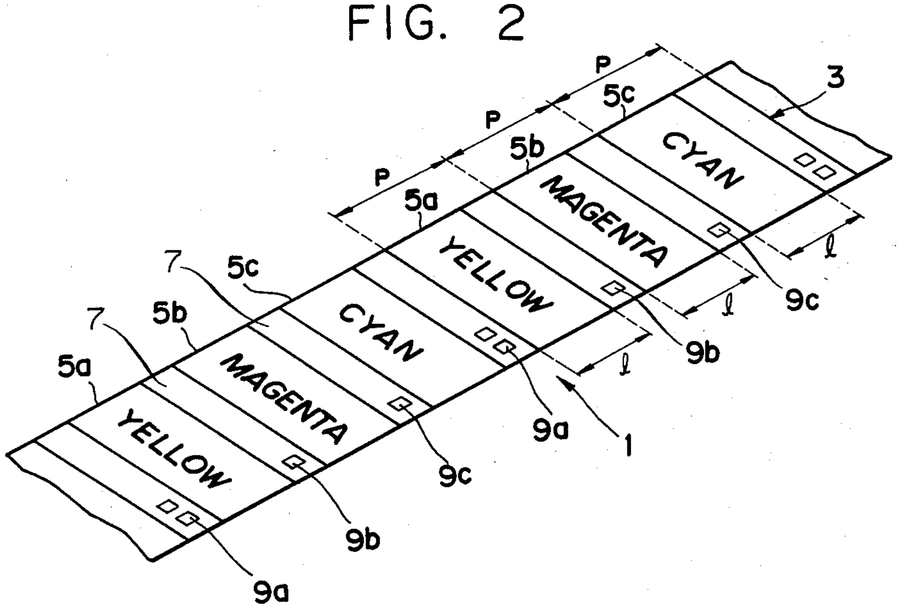
FIG. 2 is a perspective view of an ink transfer ribbon.

Referring to FIG. 2 there is illustrated an ink transfer ribbon 1 adopting the above-described subtractive mixture method. The ribbon 1 includes a base 3 made of a transparent condenser paper, polyester film or the like, on which a great number of ink zones 5*a*, 5*b*, 5*c* . . . of the same length 1 are formed with the same pitch p. These ink zones 5 are formed by applying well-known heat-dissolving yellow, magenta and cyan inks over the base 3, each color ink appearing every three ink zones 5. At each blank portion 7, defined between adjacent ink zones 5 and 5, of the base 3, there is provided a sensor mark 9*a*, 9*b* or 9*c*, which is used to detect by a detector what color zone just follows that mark. The sensor mark 9*a*, 9*b*, or 9*c* may be a through hole, metal piece, etc., and is determined according to the kind of the detector used.

Figure 1:
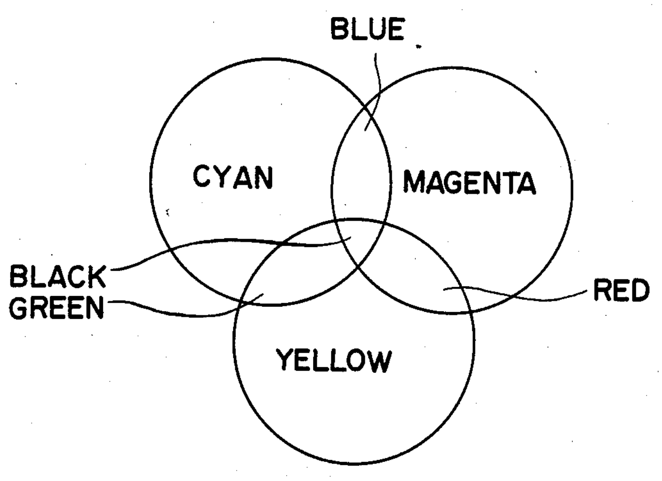
FIG. 1 PRIOR ART
FIG. 1 is an illustration of the subtractive mixture method adopted in the present invention.

As described above, heat-dissolving yellow, magenta and cyan inks are sequentially applied over the transfer ribbon 1, and hence colors shown in FIG. 1 are produced on an ordinary printing paper by transferring these three color inks applied over a set of three adjacent ink zones 5*a*, 5*b*, and 5*c* to that paper in the superposing manner.

Figure 3:
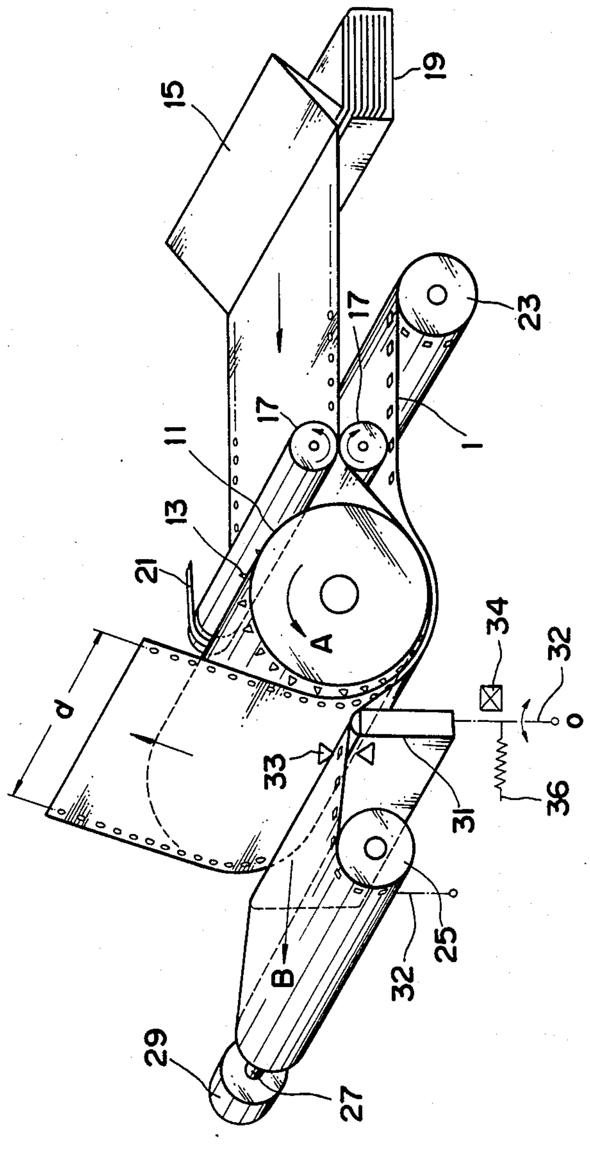
FIG. 3 is a perspective view illustrating a thermal transfer type multicolor printer used in practicing the present invention.
Figure 4:
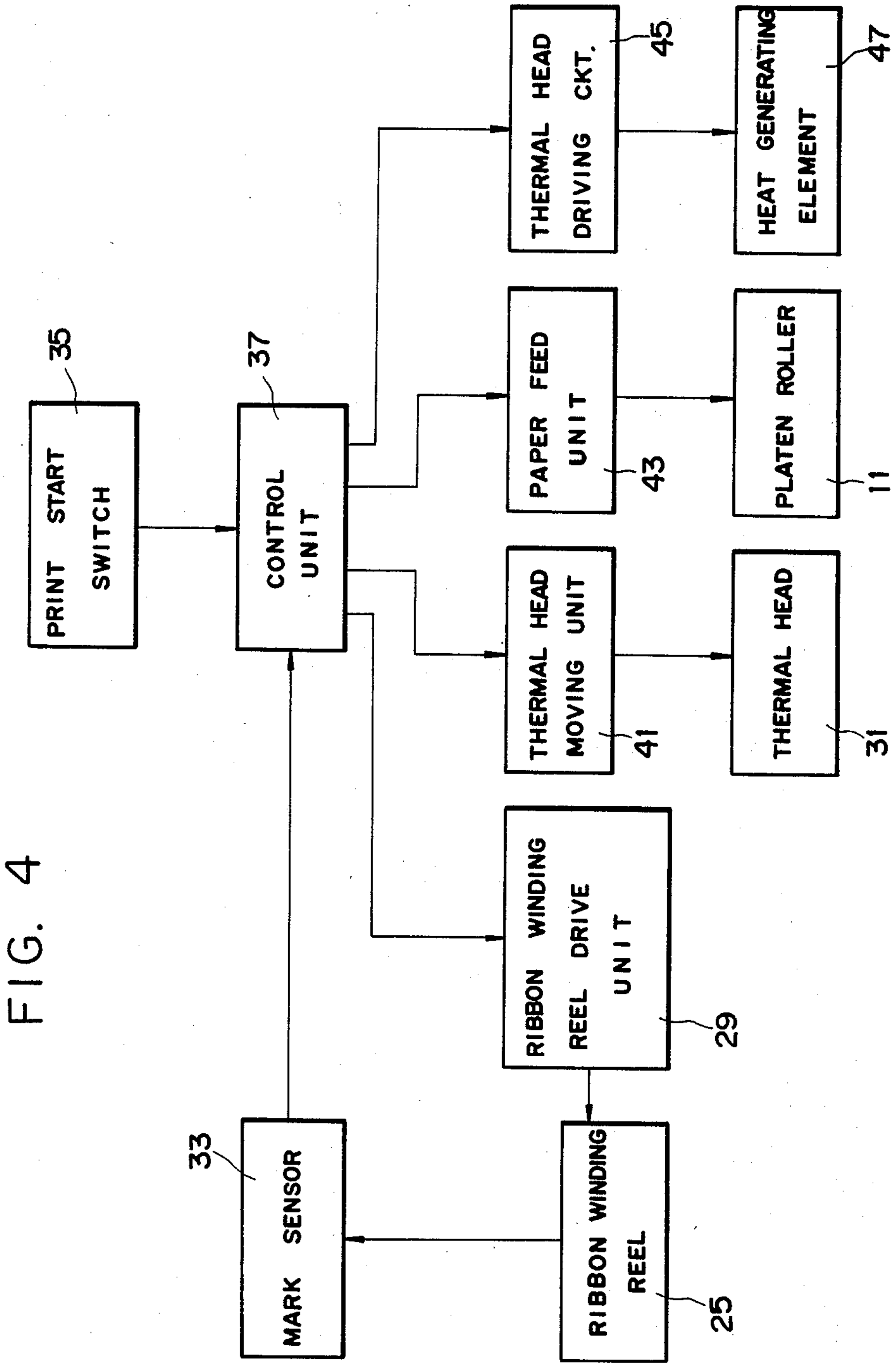
FIG. 4 is a block diagram illustrating the relation between the electrical units and the mechanical units of the multicolor printer in FIG. 3.

Now, referring to FIG. 3 there is illustrated a printer used in practicing the present invention, in which a reference numeral 11 indicates a platen roller having sprocket pins 13 mounted on the opposite peripheries thereof so as to engage with feed holes formed in the opposite edges of a printing paper 15. The platen roller 11 is rotatably supported on a frame (not shown for illustration purposes) and is rotated by a paper feed unit 43 (FIG. 4) including a stepper motor 16 and a well-known transmission gear 18 such as timing pulleys and belt.(see FIG. 7 ) On the right side (in FIG. 3) of the platen roller 11 there is disposed a pair of opposed parallel return rollers 17 and 17, which are rotatably supported on the frame and adapted to rotate in the arrow directions by a well known driving mechanism (not shown) included in paper feed unit 43 so as to provide a tension to the printing paper 15 of a fanfold paper. The printing paper 15, which is stocked in a folded condition in a paper container 19 of a box shape, is continuously supplied from it, passes through between the return rollers 17 and 17, and then is placed over the platen 11 with the feed holes being engaged with the sprocket pins 13. The printing paper 15 is always kept tight by the return rollers 17 and 17. On the paper container side of the platen roller 11 there is provided a ribbon supply reel 23 so as to be positioned below the return rollers 17 and 17. The reel 23 is rotatably supported on the frame, and has the transfer ribbon 1 wound around it, the ribbon being smaller in width than the distance d between the opposed feed holed of the printing paper 15. The ribbon 1 extends from the ribbon supply reel 23 so as to engage with the platen roller 11 with the printing paper 15 interposed between them, and is then wound around a ribbon winding reel 25. The ribbon winding reel 25 is rotatably supported on the frame on the other side of platen roller 11 and is connected to an output shaft 27 of a ribbon winding reel drive unit 39 including a slip friction clutch and an electric motor. A thermal head 31 is provided between the platen roller 11 and the ribbon winding reel 25 so as to be movable towards and away from the platen roller 11 about a point O. In this embodiment thermal head 31 has a pair of parallel rods 32 extending downwards of which lower ends are pivotally supported on the frame so that thermal head 31 is angularly movable about point O. The thermal head 31 is moved towards platen 11 by means of a solenoid 34 against a return spring 36. The solenoid 34 and return spring 36 constitute a thermal head moving unit 41. On the left side of the thermal head 31 there is provided a mark sensor 33 for detecting the sensor marks 9*a*, 9*b*, and 9*c*. In this embodiment a photodetector is used as the mark sensor 33, and marks 9*a*, 9*b*, and 9*c* are through holes of different shapes formed through the ribbon 1.

In operation, when a print start switch 35 (FIG. 4) is activated, mark sensor 33 detects by sensing sensor mark 9*a*, 9*b*, or 9*c* that an ink zone 5*a*, 5*b*, or 5*c* identified by that mark 9*a*, 9*b*, or 9*c* is in a printing position over the platen roller 11, and provides an electric signal, representing that the specified ink zone 5*a*, 5*b*, or 5*c* is in the printing position, to a control unit 37 including a microprocessor, where comparison is made as to whether or not predetermined ink zone 5*a*, 5*b*, or 5*c* is in the printing position. When the predetermined ink zone 5*a*, 5*b*, or 5*c* is not in the printing position, the control unit 37 provides an electric signal to a ribbon winding reel drive unit 29 for rotating the ribbon winding reel 25 until the predetermined ink zone 5*a*, 5*b*, or 5*c* is brought into the printing position. In this event, the printing paper 15 is prevented from accompanying the moving ribbon 1 since a braking force is applied to the platen roller 11 by a paper feed unit 43. When the predetermined ink zone 5*a*, 5*b*, or 5*c* is in the printing position, the control unit 37 supplies a thermal head moving unit 41 with a signal to energize solenoid 34, so that thermal head 31 is moved to the printing position, where the thermal head 31 is brought into abutment with the platen roller 11 through the transfer ribbon 1 and a starting portion of the printing paper 15. Then, the control unit 37 provides a thermal head driving circuit 45 with a signal to drive the thermal head 31 for energizing heat generating elements 47 incorporated into the thermal head 31 when any dot to be printed exists. The energizing of elements 47 is made when platen 11 is stationary. Thereafter, the control unit 37 provides a paper feed unit 43, which includes the stepping motor 16 for driving the platen roller 11, with a signal to rotate the platen roller 11 in a stepwise manner for advancing the printing paper in the arrow direction shown in FIG. 3. By one pulse rotation of the stepping motor the printing paper is fed by one dot line. By such alternation of driving of the thermal head 31 and the feed of the printing paper 15 by one dot line the printing is made. Assuming the yellow ink zone 5*a*, is in the printing position, by such procedures, a yellow (Y) picture component, which corresponds to a thermal pattern provided from the thermal head 31 and consists of the yellow ink of that zone 5*a*, is transferred from it to the printing paper 15, and thereby it is reproduced on that printing paper. During this ink transferring, the printing paper 15 is always subjected to a back tension applied by the return rollers 17 and 17 and is held tight. After the Y picture is reproduced on the printing paper 15, the control unit 37 provides the thermal head moving unit 41 with a signal to move the thermal head 31 away from the platen roller 11, thereby releasing the cramping of the transfer ribbon 1 and the printing paper 15 by the thermal head 31. The control unit 37 then provides to the paper feed unit 43 a signal to reverse the stepping motor thereof for rotating the platen roller 11 in the reverse direction (indicated by the arrow A in FIG. 3), so that the starting portion of the printing paper 15 is returned to the printing position. It is to be noted that during such return feed of the printing paper 15, the transfer ribbon 1 is prevented from being fed in a direction reverse to the feed direction indicated by the arrow B in FIG. 3 since a well-known anti-reverse mechanism is provided to the reel 25. When the starting portion of the printing paper 15 is returned to the printing position on the platen roller 11, the subsequent magenta ink zone 5*b* is positioned at the printing position, and a magenta (M) picture component is then reproduced and superposed on the Y picture component already reproduced according to procedures similar to the procedures described in connection with the printing of Y picture component. A cyan (C) picture component is then further superposed over the superposed pictures consisting of the Y and M pictures in the similar manner, so that a finish color picture is reproduced.

As apparent from the above description, according to the present invention a color picture in seven colors can be reproduced over a printing paper by the three transfer operations of yellow, magenta and cyan inks onto the printing paper.

The printing paper is subjected to back tension also when the platen roller 11 is reversed since the peripheral speed v' of the return rollers 17 are set slightly larger than the peripheral speed v of the platen roller 11 during the reverse rotation of the latter. Therefore, any play between the sprocket pins 13 and the feed holes of the printing paper 15 is prevented from occuring during printing, and thereby color aberration or deviation from predetermined position is eliminated.

Figure 9:
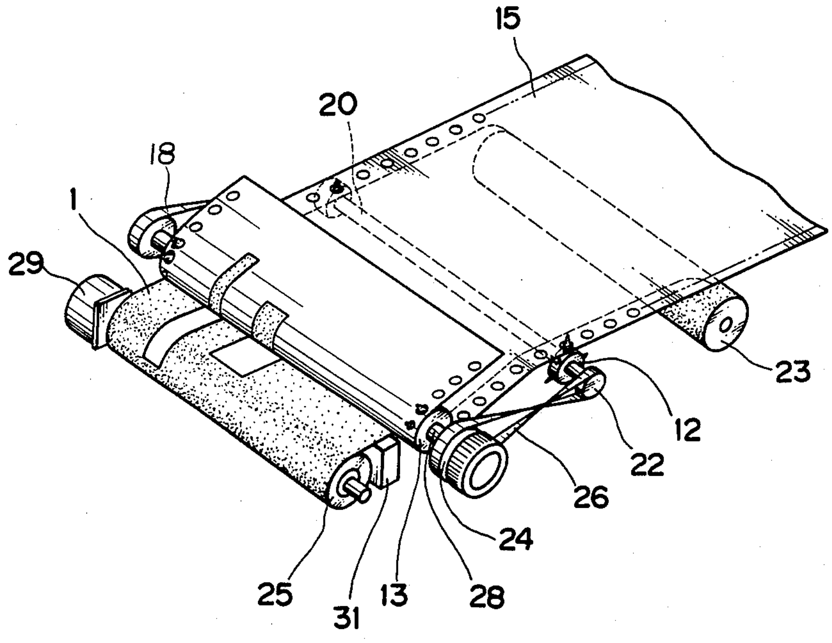
FIG. 9 is a perspective view illustrating a modification of the tension applying mechanism in FIG. 3.

FIG. 9 shows a modification of the back tension applying mechanism, in which figure like reference numerals designate similar members in FIG. 3, and explanations thereof are not given. In this modification, a pair of sprocket wheels 12 are used instead of return rollers 17 and 17. the sprocket wheels 12 and 12 are mounted on a single shaft 20 and 20 and adapted to engage with the feed holes of the printing paper 15. On one end of the shaft 20 there is mounted a timing pulley 22, which is connected to another timing pulley 24 by means of crossed timing belt 26, the timing pulley 24 being mounted on one end of a shaft 28 of platen 13. The other end of shaft 28 is connected to an output shaft of pulse motor 16 (FIG. 7) through timing pulleys and belt 18. In this modification, platten 13 and sprocket wheels 12 are disposed so as to keep the printing paper located between them tight.

As the mark sensor 33 a well-known magnetoelectric proximity detector may be used instead of the photodetector, in which case a magnetic material as mark 9 is applied on the ribbon 1.

Figure 5:
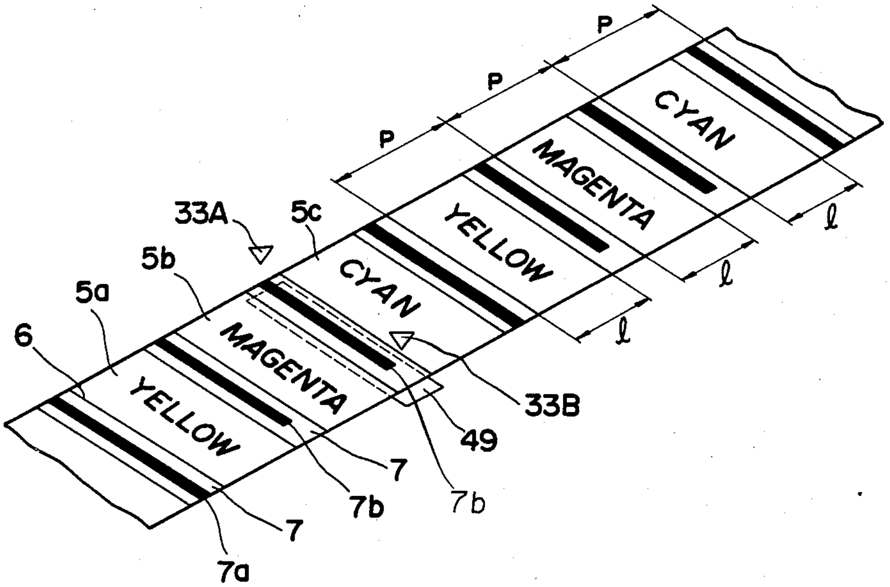
FIG. 5 is a perspective view illustrating a modification of the ink transfer ribbon shown in FIG. 2.
Figure 6:
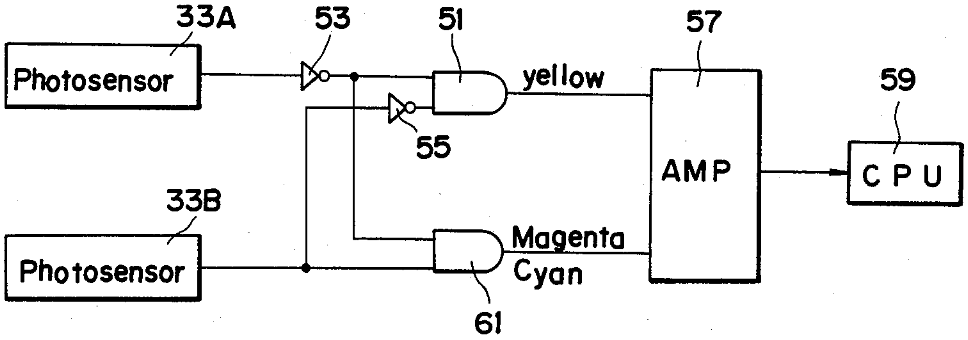
FIG. 6 is a block diagram of an ink zone detecting unit used for the ink transfer ribbon in FIG. 5.

FIG. 5 shows a modification of ink transfer ribbon 3. This ink transfer ribbon is different from that shown in FIG. 2 in that it is provided with sensor marks *7a* and *7b* of black stripe. Mark *7a* for yellow ink zone *5a* longitudinally passes through blank portion 7, and marks *7b* for magenta and cyan ink zones do not extend full length of blank portion 7. In this modification, the length 1, width, and pitch p of ink zones *5a, 5b,* and *5c* are 170 mm, 210 mm, and 182 mm respectively. A light emitted from well-known reflection type photosensors 33A and 33B passes through transparent blank portion 7 of the ribbon and is reflected by a mirror plate 49 placed just below the ribbon toward those photosensors where it is sensed. However, the light does not pass through sensor marks *7a* and *7b* and is not sensed by the photosensors. When sensor mark *7a* comes below photosensors 33A and 33B, the starting portion 6 of the immediately following yellow ink zone *5a* reaches to the printing position and those photosensors apply high signals to AND gate 51 (FIG. 6) by means of inverters 53 and 55, so that AND gate 51 provides a signal, representing that a yellow ink zone *5a* is in the printing position, through an amplifier 57 to a central processing unit (CPU) 59. When sensor mark *7b* comes below sensors 33A and 33B, sensor 33A applies a high signal to AND gate 61 by means of inverter 53 and sensor 33B also applies a high signal to AND gate 61, so that AND gate 61 provides a signal, representing that a magenta or cyan ink zone *5b* or *5c* is in the printing position, through amplifier 57 to CPU 59. Since yellow, magenta and cyan ink zones *5a, 5b,* and *5c* are disposed on ink ribbon 3 in the described order, CPU 59 can recognize which one of magenta and cyan ink zones *5a* and *5c* is in the pointing position.

Figure 7:
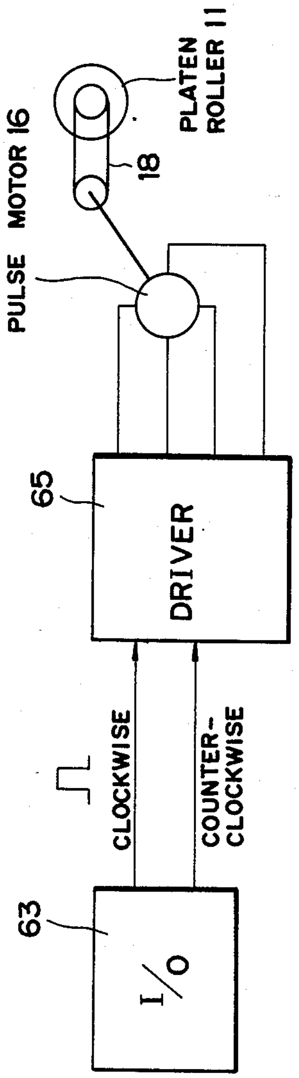
FIG. 7 is an illustration of the paper feed unit in FIG. 4.

The paper feed unit 43 is more detailedly illustrated in FIG. 7, in which a driver 65 activates, according to a signal supplied from CPU 59 (FIG. 6) through an input-output interface (I/O) 63, 4 phase 1.8° angle pulse motor 16 with a 2 phase exciter.

Figure 8:
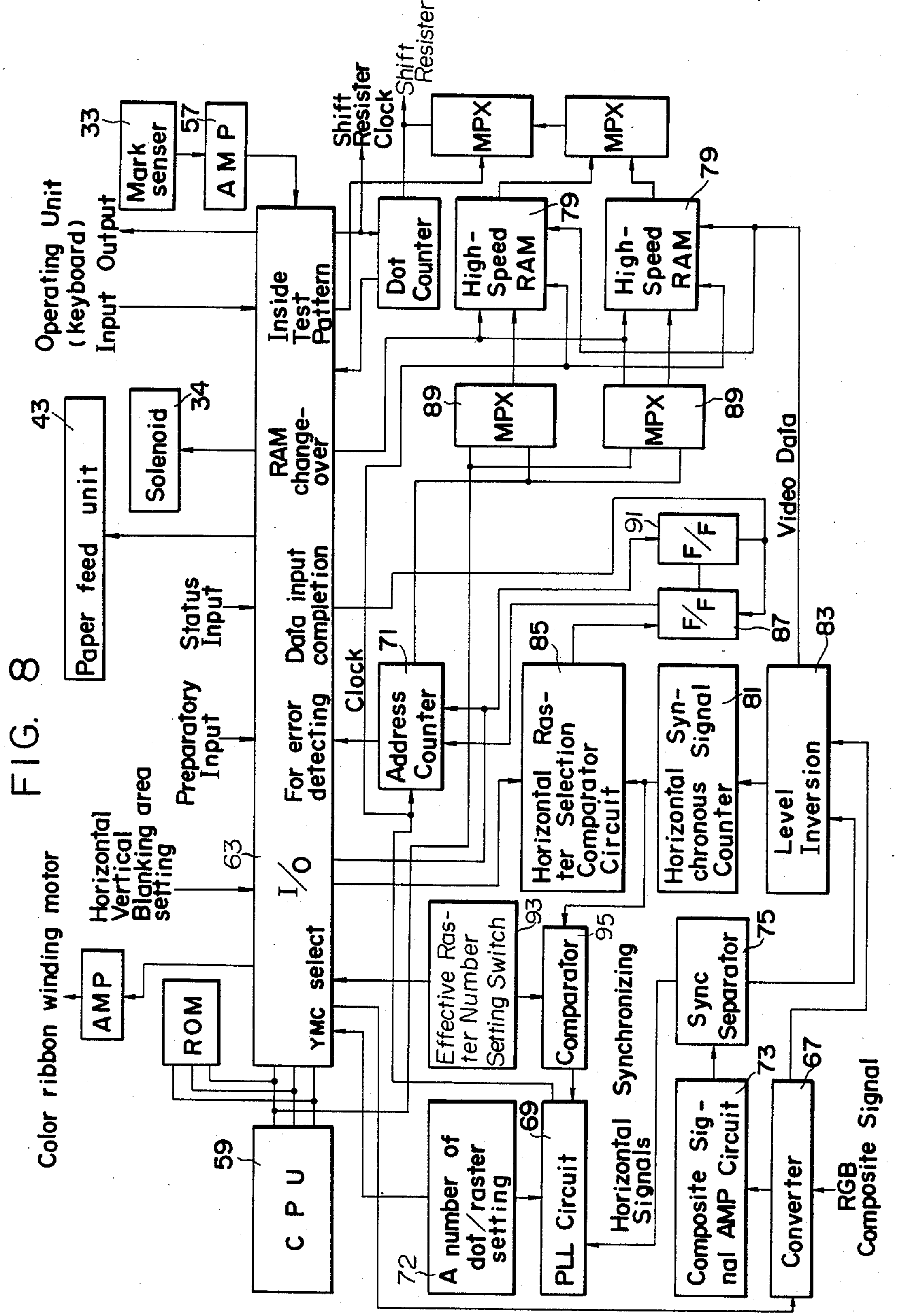
FIG. 8 is a block diagram showing the control unit in FIG. 4.

In FIG. 8 there is shown control unit 37 in more detail, in which red-green-blue (RGB) composite video signals are inputted into a converter 67 for converting the RGB signals into yellow-magenta-cyan (YMC) signals. CPU 59 sends an instruction to converter 67 as to which one of the RGB signals should be converted to the corresponding color signal of the YMC signals. A PLL circuit 69 outputs clock pulses to an address counter 71 in accordance with the number of dots per a raster, which number is set by means of a dipswitch 72, in synchronism with horizontal synchronizing signals provided from converter 67 through a composite signal amplifying circuit 73 and sync separator 75. On the other hand CPU 59 outputs to a horizontal raster selection comparator circuit 85 a raster number, of which raster video data are to be written in a high-speed random-access memory 79. A horizontal synchronous signal counter 81 outputs raster numbers by counting horizontal synchronizing signals which are transferred through converter 67 and a level inversion 83. When the raster number specified by CPU 59 and that outputted by horizontal synchronizing counter 81 are equal, a flip-flop (F/F) 87 is set and makes address counter 71 enable which thereby supplies address signals to one of high-speed RAMs79 and 79 through the corresponding multiplexer (MPX) circuit 89. The one RAM 79 which receives the address signals stores data of the one color signal supplied through converter 67 and level inversion 83. When all the signals for one raster are stored in such a manner, F/F 87 is reset and another flip-flop (F/F) 91 is set to thereby inhibit horizontal synchronous counter 81, horizontal raster selection comparator 85, and address counter 71 so that more data will not enter the one RAM 79. CPU 59 supplies address signals to this RAM 79 through corresponding MPX 89 and video data for one raster written in the one RAM 79 are thereby transferred to a shift resister (not shown) of thermal head 31. On the other hand, CPU 59 specifies the subsequent raster number. With respect to this raster video data are written into the other high-speed RAM 79 in procedures similar to those described in connection with the one RAM 79. As apparent from the above, simultaneous read/write operation is alternately carried out with the use of the two pieces of high-speed RAMs 79.

The effective raster number, e.g. 512 for one picture is set by an effective raster number setting switch or dipswitch 93 and is compared by a comparator 95 with the output from horizontal synchronous signal counter 81. After the former becomes equal to the latter, switch 93 informs CPU 59 through I/O 63 that one color signal, for example Y signal, has been processed. After the printing of the one color is completed, the starting portion of the printing paper is returned to the printing position in the already described manner. Then, CPU 59 further specifies the subsequent color signal, for example G signal, to be converted by converter 67. In procedures similar to those described in connection with the one color signal, the subsequent color signal is processed.

While the invention has been disclosed in specific detail for purposes of clarity and complete disclosure, the appended claims are intended to include within their meaning all modifications and changes that come within the true scope of the invention.

What is claimed is:

1. A method for making a thermal transfer type multicolor printing, comprising the steps of:

(a) setting an ink ribbon over a platen roller with a sheet of printing paper being interposed therebetween, the ink ribbon having at predetermined intervals a plurality of ink zones each carrying one of heat-dissolving inks of different colors;

(b) then, positioning one of the ink zones at a printing position on the platen roller, the one ink zone being of a predetermined color;

(c) placing a thermal head at the printing position against the positioned one ink zones;

(d) driving the thermal head for transferring the ink of the one ink zone to the printing paper so that a first dot line of one picture component, for the predetermined color, of a picture to be printed is reproducted by the use of ink of the one ink zone;

(e) after the step (d), advancing the printing paper and the ink ribbon for a subsequent printing of the picture component;

(f) repeating the steps (d) and (e) until the whole picture component for the predetermined color is reproduced on the printing paper;

(g) then, moving the thermal head away from the printing position;

(h) after the step (g), moving backwards a predetermined restarting portion of the printing paper to the printing position on the platen roller for reproducing the remaining picture components; and (i) repeating the steps (b) to (h) with respect to the other ink zones of different colors for reproducing the remaining picture components on the printing paper, whereby a multicolor picture is reproduced on the printing paper.

2. A method as recited in claim 1, wherein the heat-dissolving inks includes yellow, magenta and cyan inks, and wherein the yellow, magenta and cyan inks each appear every three ink zones.

3. a method as recited in claim 2, wherein the positioning step (b) further includes: detecting a sensor mark provided to the ink ribbon adjacent to each of the ink zones, the sensor mark indicating a color of the ink of the adjacent ink zone; comparing the detected color of the ink with the predetermined color; and when the detected color of the ink is different from the predetermined color, advancing the ribbon until the detected color becomes identical to the predetermined color.

4. A method as recited in claim 3, during the steps (c) to (f), further comprising the step of pulling a portion, situated downstream of the printing position, of the printing paper toward downstream of the printing paper for applying a back tension to the downstream situated portion to thereby keep that portion tight, whereby deviation of the picture reproduced is prevented.

* * * * *